T. W. JOHNSON.
GRAPHITE FEEDING LUBRICATOR.
APPLICATION FILED MAY 13, 1914.
1,137,978.
Patented May 4, 1915.
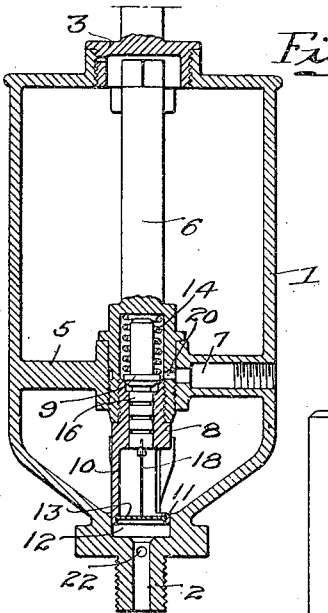
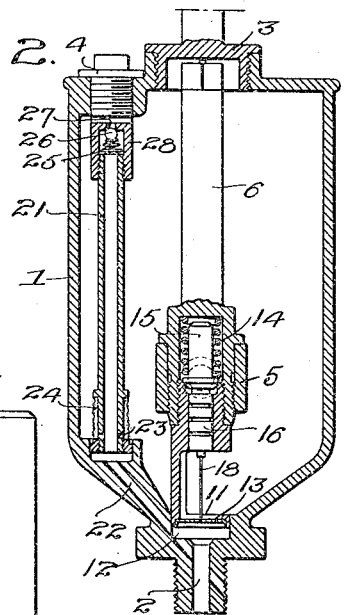
Witnesses.
Walter Chism
William F. Nase
Inventor:
Thomas W. Johnson
by his Attorneys
Howson & Howson

UNITED STATES PATENT OFFICE.

THOMAS W. JOHNSON, OF PHILADELPHIA, PENNSYLVANIA.

GRAPHITE-FEEDING LUBRICATOR.

1,137,978. Specification of Letters Patent. Patented May 4, 1915.

Application filed May 13, 1914. Serial No. 838,330.

*To all whom it may concern:*

Be it known that I, THOMAS W. JOHNSON, a citizen of the United States, residing in Philadelphia, Pennsylvania, have invented certain Improvements in Graphite-Feeding Lubricators, of which the following is a specification.

One object of my invention is to provide an automatically acting device for feeding graphite or other lubricant to a steam line or to the cylinder of an engine, whose parts shall be so arranged and constructed that it will operate to intermittently deliver predetermined amounts of material under the conditions commonly found in service, it being also desired that the device shall be reliable and inexpensive as well as simple and substantial in construction.

These objects and other advantageous ends I secure as hereinafter set forth, reference being had to the accompanying drawings, in which:—

Figures 1 and 2 are vertical sections, taken at right angles to each other, illustrating a lubricator constructed according to my invention; Fig. 3 is an elevation of the movable element of that form of the invention shown in Figs. 1 and 2; Figs. 4 and 5 are vertical sections, taken at right angles to each other, illustrating a modified form of the invention.

In the above drawings, 1 represents a cup or container having a threaded outlet 2 which may be screwed into a steam line or cylinder, or into a conduit leading to the same, there being also at the top of the container two openings normally closed by steam tight plugs or covers 3 and 4. Within the container is a transverse member 5 expanded at its central portion to form a bearing for the hollow lower end of a stem 6 and formed with a passage 7 opening on the side of the container and also into the hollow interior of said stem. This latter has screwed or otherwise attached to its lower end a small cylinder casing 8 whose upper end is open and formed to provide a seat for a valve 9, while its lower end has on one side a downward extension 10 terminating in a ring 11 guided in or fitting an expanded portion 12 of the passage through the outlet 2. This ring 11 serves as a support for a horizontal centrally perforated plate 13 so arranged that graphite or other material within the container 1 is guided onto it by the sides thereof.

The valve 9 above referred to is operative within the hollow lower end of the rod 6 and is normally pressed toward its seat by a coiled spring 14 mounted upon its upwardly projecting end 15. Said valve is formed integral with a plunger 16 operative in the casing 8 and provided with a series of annular packing grooves 17 designed to in a large measure prevent the escape of steam from the container into the hollow cavity of the stem 6. The feeding needle 18 is fixed to the lower face of the plunger 16 in line with the opening 19 through the plate 13, the length of the needle being such that when the valve 9 is seated it projects through or into the plate but when for any reason the spring 14 is compressed to allow the valve to become unseated and the plunger 16 to move upwardly, its lower end is raised a short distance above the lower face of said plate. The hollow of the stem 6 communicates with the passage 7 through a port 20 and under operating conditions said passage is connected to one end of an engine cylinder or other source of varying steam pressure.

Within the container 1 in line with the opening closed by the plug 4, I mount a tube 21 communicating through a passage 22 with the outlet 2 and having near its lower end ports or openings 23 from which the graphite in the container is excluded by a screen 24. On the upper end of the tube 21 I mount a spring 25 carrying a ball valve 26 co-acting with a valve seat opening in a cap 28 screwed to the upper end of the tube 21 so as to normally close the same.

Under conditions of use the container 1 is filled with graphite or other lubricant which it is desired to feed and steam under pressure from the line or cylinder is admitted through the outlet 2 and passage 22 as well as through the ports 23 in the tube 21. With the passage 7 connected to one end of the engine cylinder, the cavity in the rod 6 containing the valve 9 is filled with steam alternately at exhaust pressure and at full cylinder pressure. When, therefore, the former condition exists, the steam at line pressure acts on the under face of the plunger 16, forcing it upward against the action of the spring 14, thereby raising the needle 18 above the plate 12. The lubricant in the container then flows downwardly under the point of the needle and immediately thereafter the admission of steam under full pressure from the engine cylinder to the passage 7, causes the plunger 16 to be forced downwardly under the action of the spring 14 and said pressure, with the result that the needle is forced into the opening 19 of the plate 13. A definite amount of the lubricant is carried through the plate by the needle and is delivered to the outlet passage 2.

When steam is exhausted from the end of the engine cylinder connected to the passage 7, the needle 18 is raised by reason of the steam pressure on the lower end of the plunger thus allowing another body of lubricant to flow over the opening 19 of the plate. As a consequence of this repeated operation, there is fed at each stroke of the engine a relatively small but definite quantity of the lubricant depending in amount upon the dimensions of the needle 18 and of the opening 19, so that the valves and piston of the engine are properly supplied. The upper end of the rod 6 is preferably squared for the reception of a handle to facilitate its removal.

When the engine is shut down the resulting reduction and ultimate absence of pressure in the tube 21 and passage 22, would sooner or later cause the screen 24 to be damaged by reason of the fact that the graphite or other lubricant would pack around it under the action of the steam under pressure within the container and finally collapse or break it. The provision of the valve 26, however, effectually prevents such an injury, since as the pressure falls within the tube 21 the steam within the container unseats the valve and escapes past it into said tube.

In that form of my invention shown in Figs. 4 and 5, the bottom of the container 1ª like that of the container 1 is formed to direct material therein toward a central cavity 12ª forming an enlargement of the upper end of the passage in the outlet 2. This enlargement, however, is partitioned from the main part of the container by a plate 13ª having, in this case, a transverse slot in which closely fits a toothed wheel 30 mounted on a suitable spindle supported in bearings forming part of said plate. This wheel is so positioned that a part of it projects through the plate 13ª, although its main portion lies within the cavity 12ª whose sides are provided with bearings for a spindle 31 carrying a worm 32 engaging the teeth of said wheel. Said spindle passes through a suitable stuffing box 33 and has fixed to it a ratchet wheel 34 designed to be intermittently turned by a pawl 35 pivoted to an oscillatory arm 36 which is connected, in any of the ways well known to the art, to the machine to be lubricated. I also provide a second pawl 37 pivoted to a lug 38 projecting from the lower part of the container 1ª and so placed as to prevent backward movement of the ratchet wheel 34. In this instance a tube 21ª is connected at its lower end through a branched pipe 39 with the interior of the cavity 12ª and has screened ports 23 for admitting steam under pressure from said cavity into the interior of the container. As before, the upper end of this tube is closed by an inwardly opening spring-pressed valve 26, operative against a seat concentric with an opening 27 through the cap 28. In this case, the worm wheel 30 is intermittently turned by the worm 32, and the lubricant, which at all times lies around the teeth of said wheel, being caught between the same, is carried through the plate 13ª into the chamber 12ª where it is dislodged either by gravity or by the worm 32 and finally falls into the passage of the outlet 2 leading to the steam line or to the engine cylinder. As before, the valve 26 automatically opens to permit of the escape of the steam under pressure within the container 1ª and thus prevents damage to the screen 24 surrounding the parts 23.

I claim—

1. The combination in a lubricator of a container having an outlet opening; a structure mounted in the container and having a cylinder for connection with a source of fluid under varying pressure; a piston in said cylinder; a needle connected to the piston and operative toward and from said opening; and a spring acting to press the needle toward the outlet opening.

2. The combination in a lubricator of a container having an outlet opening; a crossmember in said container having a passage for connection to a source of fluid under varying pressure; a cylinder supported by said cross-member and connecting with the passage therein; a piston in said cylinder; with a needle connected to the piston and operative toward and from the out-let opening of the container.

3. The combination in a lubricator of a container for solid lubricant having an outlet and a relatively small opening in its lower part leading to said outlet; a reciprocating member in the body of the container; and a needle actuated by said member and operative through said outlet opening for intermittently causing definite amounts of solid material to be forced through said opening, there being a passage independent of the small opening for connecting the interior of the container and the outlet.

4. The combination in a lubricator of a container for solid material having a relatively small outlet opening; a reciprocable needle capable of moving into and out of said opening; and means for reciprocating said needle to force definite amounts of lubricant through the opening, the same including a spring acting to force the needle toward said opening.

5. The combination in a lubricator of a container for solid lubricant having its interior connected and permanently exposed to a source of fluid under pressure and provided with a relatively small discharge opening; a cylinder; a piston operative therein; a needle reciprocated by the piston and mounted to operate within the discharge opening in the container; and a conduit connecting the cylinder with a source of fluid under varying pressure.

6. The combination in a lubricator of a container; a cylinder therein connected to a source of fluid under varying pressure; a plunger operative in the cylinder; a spring acting on the plunger to tend to move it in the same direction as said fluid under varying pressure; with a needle connected to the plunger and reciprocable thereby through a relatively small outlet opening in the lower part of the container.

7. The combination in a lubricator of a container for solid lubricant having an outlet conduit; a device for intermittently feeding definite amounts of lubricant from the container into said conduit; a tube connected to the outlet conduit and extending into the container with a screened opening at the lower part thereof; and an inwardly opening check-valve at the upper end of said tube.

8. The combination in a lubricator of a container having an outlet conduit; a plate in the lower part of the container having a relatively small opening leading to said conduit, there being a passage independent of said opening connecting the conduit with the interior of the container; a cylinder in the container connected with a source of fluid under varying pressure; a plunger reciprocable within the cylinder; with a needle operatively connected to the plunger and movable thereby into and out of the opening in the plate.

9. The combination in a lubricator of a container for lubricant having an outlet conduit; a cylinder in the container connected to a source of varying pressure; a piston in said cylinder; a valve carried by the piston and interposed between the cylinder and said pressure source; and means actuated by the piston for periodically delivering lubricant from said container into the outlet conduit.

10. The combination in a lubricator of a container for lubricant having an outlet and inlet conduit; a cylinder mounted in the container and connected to a source of varying pressure; a piston in said cylinder; a valve carried by the piston and interposed between the cylinder and said source of pressure; a spring tending to keep said valve seated; and means actuated by the piston for periodically delivering lubricant from the container into the outlet opening.

11. The combination in a lubricator of a container for lubricant having its interior permanently connected with a source of fluid under pressure and provided with an outlet; a cylinder in said container having one end opening into the same and the opposite end connected to a source of fluid under varying pressure; a plunger in the cylinder having one end exposed to the constant pressure in the container, and its opposite end acted on by the fluid from the varying source thereof; with a needle connected to said plunger and movable thereby toward and from the opening.

12. The combination in a lubricator of a container for lubricant, having its interior permanently connected with a source of fluid under pressure and provided with an outlet; a cylinder in said container having one end opening into the same and the opposite end connected to a source of fluid under varying pressure; a plunger in the cylinder having one end exposed to the constant pressure in the container, and its opposite end acted on by the fluid from the varying source thereof; with a needle connected to said plunger and movable thereby toward and from the opening; and a spring acting on the plunger in opposition to the constant pressure within the container.

In testimony whereof, I have signed my name to this specification, in the presence of two subscribing witnesses.

THOMAS W. JOHNSON.

Witnesses:
WILLIAM E. BRADLEY,
WM. A. BARR.

Copies of this patent may be obtained for five cents each, by addressing the "Commissioner of Patents, Washington, D. C."